(No Model.)  7 Sheets—Sheet 1.

J. P. CLEAL.
CASH REGISTER AND INDICATOR.

No. 523,106. Patented July 17, 1894.

Witnesses.
S. W. Brainard.
G. S. Gleason.

Inventor:
Joseph P. Cleal
by Edward Rector
his atty (No Model.)

7 Sheets—Sheet 3.

J. P. CLEAL.
CASH REGISTER AND INDICATOR.

No. 523,106. Patented July 17, 1894.

Witnesses.
S. W. Brainard,
Thomas Durant

Inventor.
Joseph P. Cleal
by Edward Rector
his atty (No Model.) 7 Sheets—Sheet 5.
J. P. CLEAL.
CASH REGISTER AND INDICATOR.
No. 523,106. Patented July 17, 1894.

(No Model.)　　　　　　　　　　　　　　　　7 Sheets—Sheet 6.
J. P. CLEAL.
CASH REGISTER AND INDICATOR.
No. 523,106.　　　　　　　　　Patented July 17, 1894.

(No Model.) 7 Sheets—Sheet 7.
J. P. CLEAL.
CASH REGISTER AND INDICATOR.

No. 523,106. Patented July 17, 1894.

Witnesses.
S. W. Brainard,
Thomas Durant

Inventor.
Joseph P. Cleal
by Edward Rector
his atty.

UNITED STATES PATENT OFFICE.

JOSEPH P. CLEAL, OF DAYTON, OHIO, ASSIGNOR TO THE NATIONAL CASH REGISTER COMPANY, OF SAME PLACE.

CASH REGISTER AND INDICATOR.

SPECIFICATION forming part of Letters Patent No. 523,106, dated July 17, 1894.

Application filed February 24, 1894. Serial No. 501,385. (No model.)

*To all whom it may concern:*

Be it known that I, JOSEPH P. CLEAL, a citizen of the United States, residing at Dayton, in the county of Montgomery and State of Ohio, have invented a certain new and useful Improvement in Cash Registers and Indicators, of which the following is a description, reference being had to the accompanying drawings, forming part of this specification.

My invention relates to improvements upon machines of the character of those shown and described in Letters Patent of the United States Nos. 420,554 and 420,555, granted to Fuller and Griswold, and in the pending application of William E. Brooke, Serial No. 496,156, filed January 8, 1894, for improvements upon such machines, and it consists in a certain improvement upon and simplification of the invention of the said Brooke, and in a certain further improvement upon the machines of the Fuller and Griswold patents as now manufactured and sold. Its novelty will be hereinafter set forth and particularly pointed out in the claims.

Figure 1:
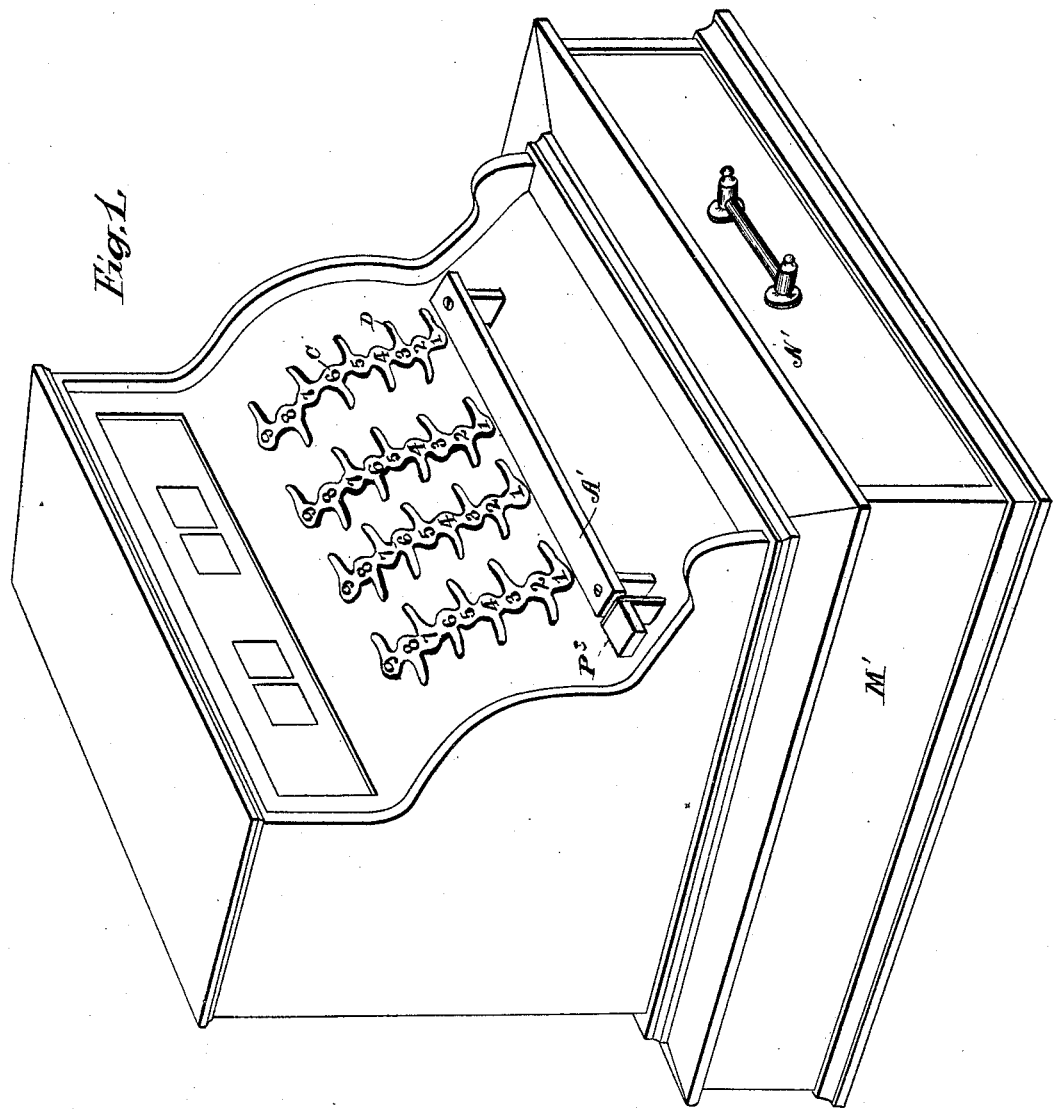
Figure 2:
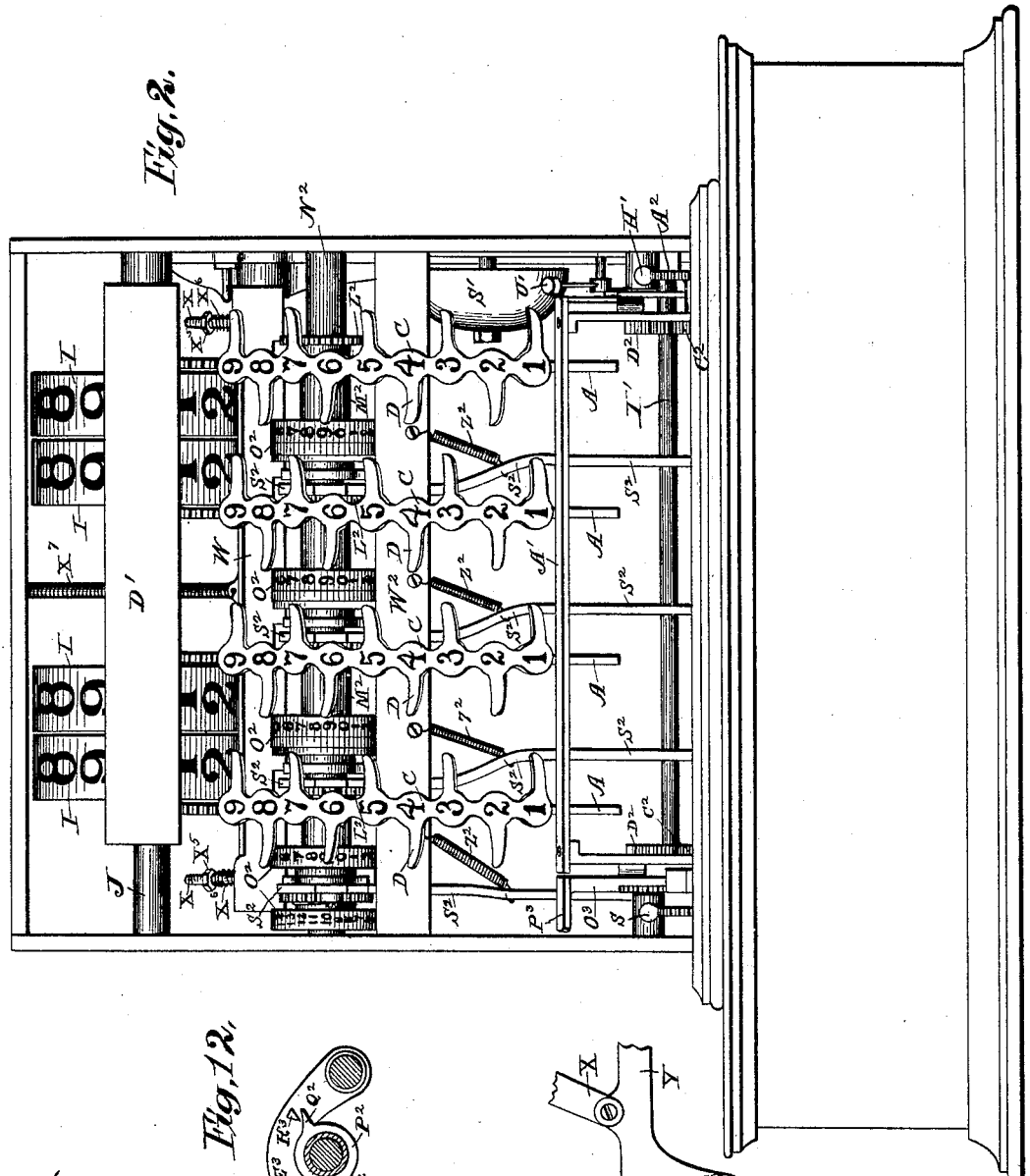
Figure 3:
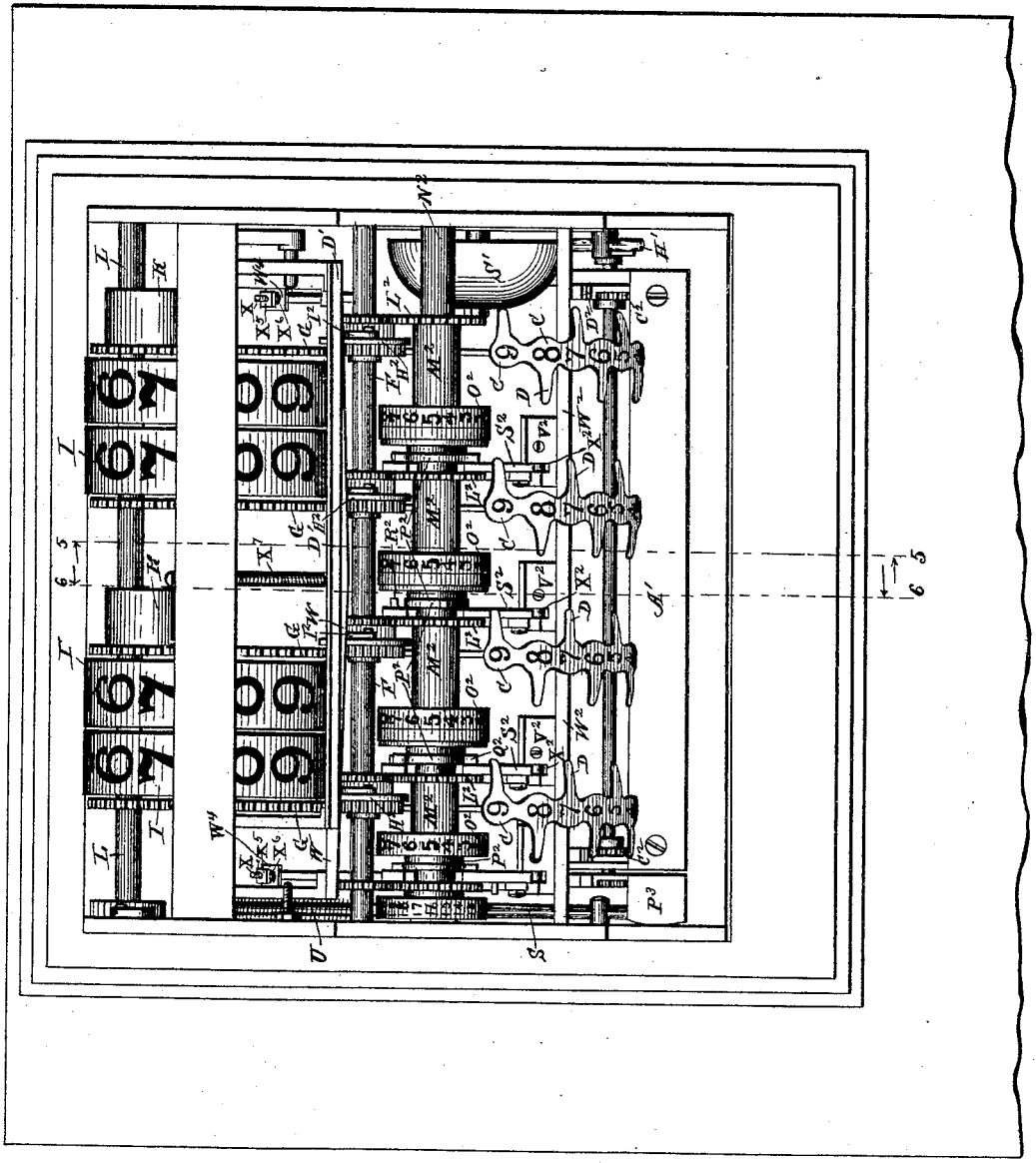
Figure 4:
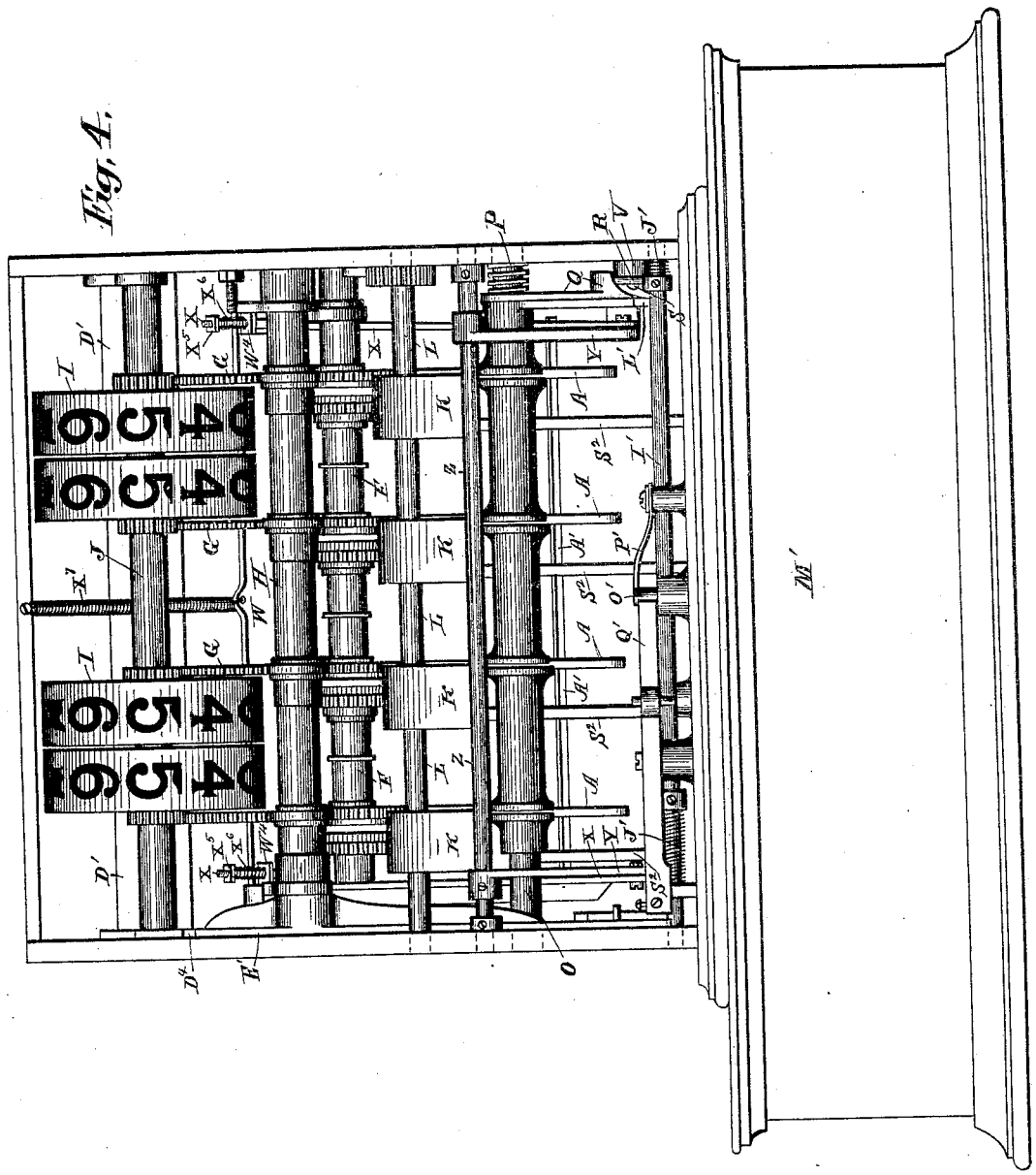
Figure 5:
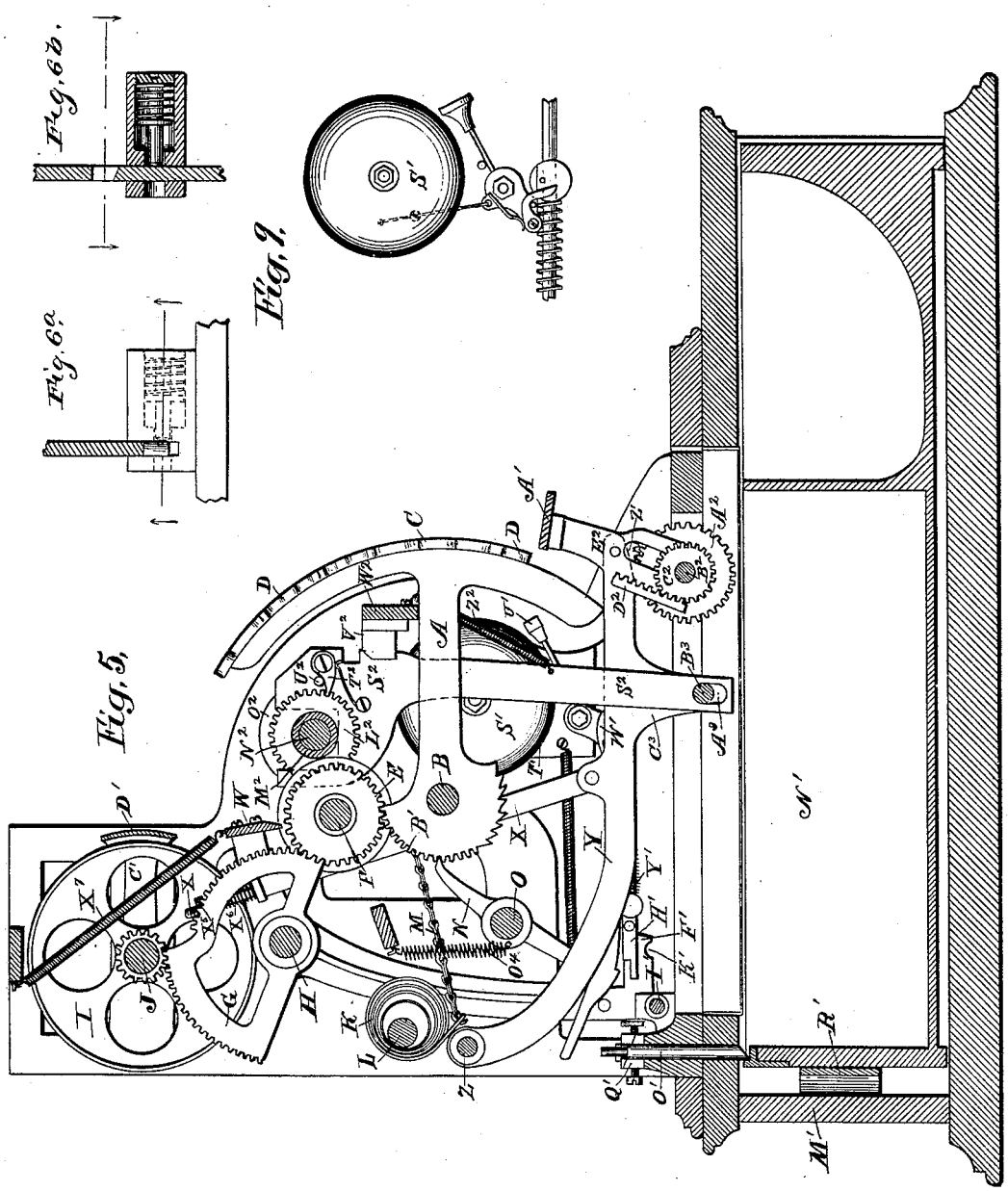
Figure 6:
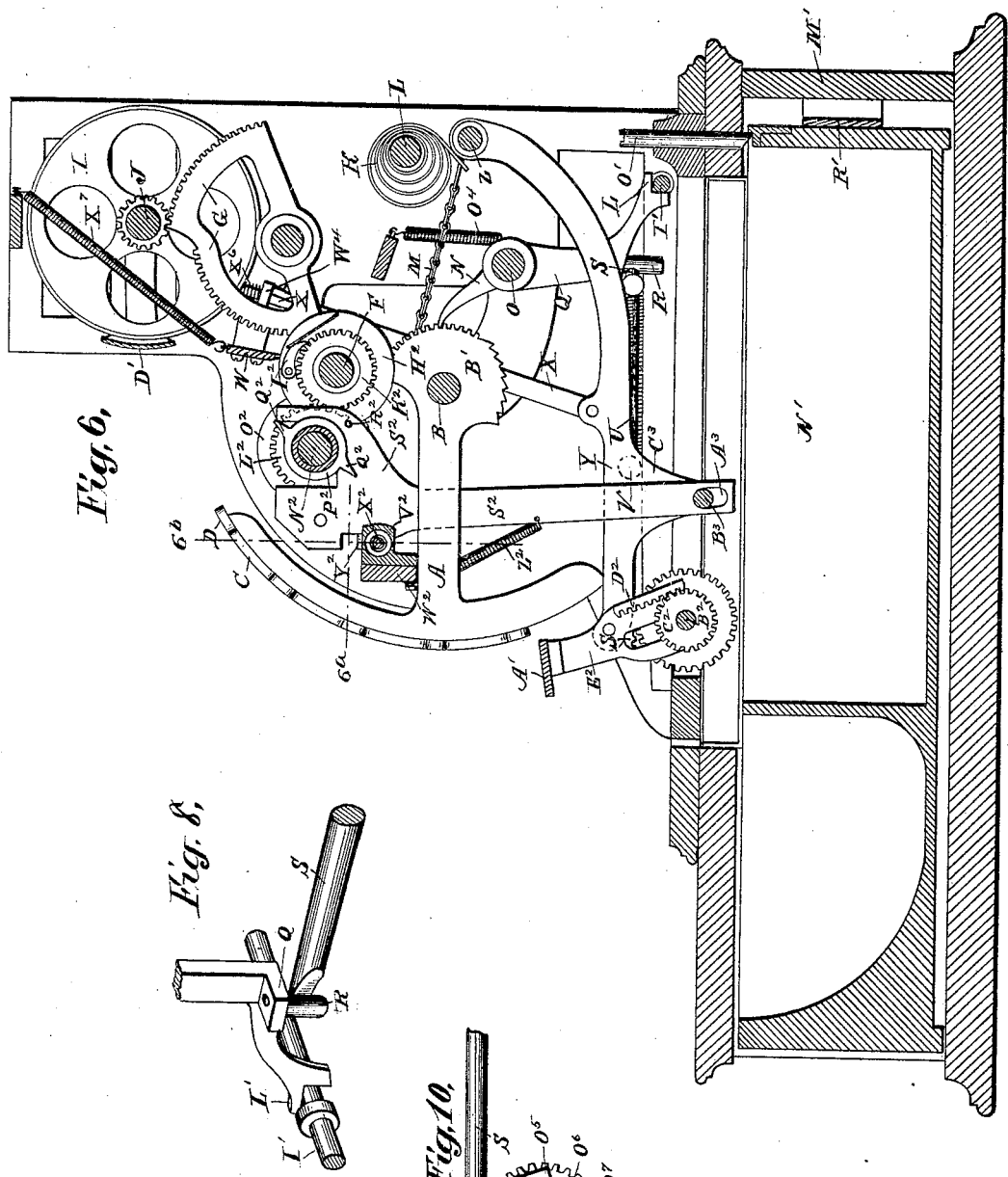
Figures 7, 11:
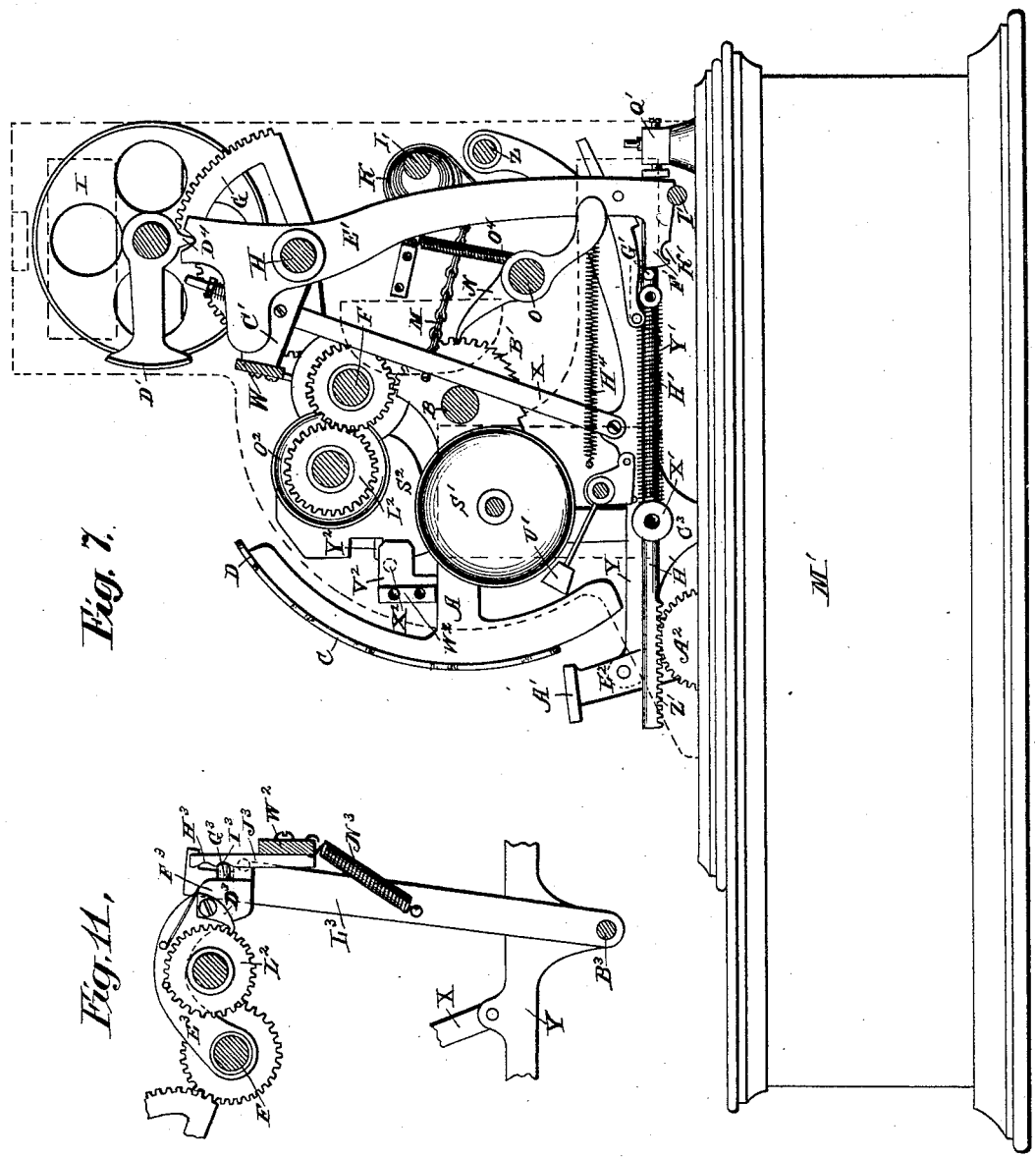

In the accompanying drawings Figure 1 is a perspective view of one of the machines referred to, within its casing; Fig. 2 a front elevation of the same with the casing removed; Fig. 3 a top plan view; Fig. 4 a rear elevation; Fig. 5 a vertical section approximately through the middle of the machine looking toward the right, and Fig. 6 a corresponding view looking toward the left; Fig. 6$^a$ a detail vertical section through the housing of the spring-plunger, showing the latter and part of the pawl-carrier; Fig. 6$^b$ a horizontal sectional detail of the same parts; Fig. 7 an end elevation of the right end of the machine with the side frame in dotted lines to expose the parts beyond; Fig. 8 an enlarged detail of the releasing devices; Fig. 9 a detail view of the gong-sounding devices; Fig. 10, a detail view of the devices for actuating one of the releasing rods; Figs. 11 and 12, detail views of a modification of the transfer devices.

The same letters of reference are used to indicate identical parts in all the figures.

The operating devices of the machine consist of levers A loosely hung upon the horizontal rod B extending across the middle portion of the machine, Fig. 4. These levers project at their front ends through vertical slots in the front plate of the casing, Fig. 1, and have secured to them curved plates C, each bearing a series of numbers, in this instance the nine digits, and having projecting from its opposite sides in alternate order an equal number of finger-pieces D. The rear ends of the levers, about the rod B, are widened into circular plates each of which has gear teeth cut upon one part of its periphery, thereby forming a segmental gear B'. By means of intermediate pinions E loose upon a rod F and meshing with the segments B', and gear-toothed plates G hung upon a rod H, Fig. 5, the levers A are geared to the indicator wheels I which are loose upon a rod J. Each of these wheels bears a series of indicating numbers representing the nine digits and a naught, and the adjustment of the parts is such that when the front end of any one of the levers is pulled downward until the finger-piece opposite one of its numbers reaches a given point the indicator geared to such lever will be turned until its corresponding number is brought to the reading opening or window in the casing.

The operating levers are yieldingly held in their upper and normal position, and returned thereto after being pulled downward and released, by coiled springs K secured to and wound around a fixed rod L at the rear of the machine and connected at their free ends by chains M to the rear ends of the levers A above their pivotal rod B. For the purpose of temporarily holding the levers in any position to which they may be moved, to cause the indicating numbers to remain temporarily in view, there is provided a series of holding pawls N carried by a rod O loosely mounted at its opposite ends in the side frames of the machine and capable of slight endwise movement. The pawls are spaced upon the rod by their extended hubs, Fig. 3, and movement of them longitudinally upon the rod prevented, while springs O$^4$ connected to their hubs yieldingly hold them engaged with the gear-toothed segments B' upon the ends of the operating levers A. While so engaged they permit the levers to be rocked downward, but prevent return upward movement of them, so that when the front end of any lever is pulled downward and released from the hand of the operator its co-operating pawl will hold it in the position to which it has been moved.

When the rod O is slid to the left, by means to be described, the pawls are carried out of engagement with the segments and the levers released and returned to normal position by the springs K before referred to, thereby resetting the operated indicators to zero.

A spring P coiled around the rod O at its left hand end and confined between a hub or collar thereon and the side frame of the machine; Fig. 4, yieldingly holds the rod in and returns it to its normal right hand position.

Fast upon and depending from the rod near its left hand end is an arm Q, carrying upon a vertical pivot an anti-friction sleeve R, Fig. 8, adapted to co-operate with the beveled rear end of a sliding rod S mounted in guides upon the side frame, Figs. 2, 5 and 6. The rear end of the rod S is beveled off upon its left hand side and arranged to engage the anti-friction sleeve upon the arm Q when the rod S is slid rearward, and thereby force the rod O to the left and disengage the pawls N from the lever segments, releasing the latter and permitting the return of them and the indicators to initial position as before described.

A spring U coiled around the rod S between its rear guideway and a block V fast thereon and sliding upon the edge of the frame, Fig. 6, yieldingly holds the rod in and returns it to normal position.

For the purpose of arresting the operated levers and indicators, and preventing excess of movement of them under quick or violent operation of the levers, there is provided a locking bar W hung by side arms at its opposite ends upon the rod H and overlying the pinions E.

Passing through and projecting above lugs $W^4$ upon the supporting side arms of this bar W are the upper ends of two rods X whose lower ends are pivoted to the side arms Y of a vibrating pressure-frame consisting of said arms Y hung at their rear ends upon a cross rod Z at the rear of the machine, and rigidly connected at their forward ends by a pressure-bar A′ extending across the machine immediately in front of the operating levers, Figs. 1, 2 and 3.

Surrounding the upper ends of the rods X, above the lugs $W^4$ on the side arm of the locking bar W, and confined thereby by nuts $X^5$ screwed upon the threaded ends of said rods, are coiled springs $X^6$ which serve to yieldingly hold the rods X, and consequently the presser-frame Y Y A′, in their upper normal positions.

A coiled spring $X^7$ connected at its lower end to the bar W and at its upper end to the top cross bar of the framework yieldingly holds the bar W in its upper normal position. This spring is of sufficient strength to support the weight of the bar W and the parts resting upon it, but when the pressure bar A′ is depressed and the rods X drawn downward the tension of the springs $X^6$ will overcome that of the spring $X^7$ and depress the bar W, causing the latter to engage the pinions E, thereby locking the same and the parts geared to them from further movement. The bar W will be arrested by the pinions E, but the springs $X^6$ will permit the pressure bar A′ to be still further depressed, the springs $X^6$ being compressed between the lugs $W^4$ on the side arms of the bar W and the nuts $X^5$ upon the rods X as the latter are drawn downward.

In operating the register the finger is placed upon the finger-piece of the proper lever opposite the number it is desired to indicate and register and the bar is pulled downward until the finger of the operator strikes the pressure-bar A′. This will cause the indicator geared to such lever to be turned until the number corresponding to the finger-piece is brought to the sight-opening and an amount corresponding thereto to be added upon the register hereinafter described. When the operator's finger strikes the pressure-bar A′ it will depress the same and pull the locking bar W downward into the engagement with the pinions E, the spring $X^7$ readily yielding for this purpose; but the springs $X^6$ are of such strength that they will not be compressed to permit further movement of the bar A′, unless the operator exerts considerable pressure upon the latter, or at least the strength of these springs is enough greater than that of the springs $X^7$ to enable the operator to readily know when he has depressed the bar A′ just far enough to engage the locking bar with the pinions E.

If the amount to be indicated and registered is such that the operation of only one lever is required the operator will continue to depress the bar A′, after the locking bar W has engaged the pinions as above described, until the bar A′ has been given its full downward movement, for the purpose of sounding the alarm, opening the money-drawer and performing the other duties of the bar A′, hereinafter described, but if the amount is such that the operation of two or more levers is required he will depress the bar A′ at the operation of each of them except the last one only far enough to engage the locking bar W with the pinions, and at the operation of the last one will depress the bar A′ to its full limit of movement to sound the alarm, release the money-drawer, &c.

Hung by side arms C′ upon the rod J is a screen plate D′ extending across the indicator wheels I at the line of the sight openings in the casing. When this plate is thrown upward, above the sight opening, the indicators are exposed to view, and when it is lowered in rear of said opening the indicators are hidden. The hub of the right hand side arm C′ which surrounds the rod J is provided upon its under side with a lug $D^4$ which fits in a notch in the upper end of a lever E′ hung upon the rod H, Fig. 7. When the lower end of this lever is thrown rearward and its upper end forward the side arms C′ will be rocked upon the rod J and the screen plate D′ thrown upward to expose the indicators. The lever extends at its lower end to the bottom of the framework and is provided with a forwardly extending plate F'. The front end of this plate stands in the path of a stud or pin G' projecting laterally from a backwardly and forwardly movable rod H' mounted in guideways upon the side-frame. When this rod is pushed rearward the pin G' engages the plate F' and rocks the lever and throws up the screen plate to expose the indicators. A coiled spring $H^4$ connected at its forward end to the framework and its rear end to the lever E' near its lower end yieldingly holds the latter in its normal position. The lower edge of the lever and its plate F' fit in a groove or notch in an endwise movable rod I' loosely mounted at its opposite ends in the side frames. A coiled spring J' surrounding the left hand end of the rod between a collar thereon and the side frame of the machine, Fig. 4, presses the rod toward the right. The lower edge of the plate F' is provided near its forward end with a notch K' and when the lower end of the lever is moved rearward until this notch is brought opposite the rod I' the latter is thrown to the right by its spring J', the rounded upper half of the rod fitting in the notch and holding the lever in its rearward position, with the screen plate D' elevated and the indicators exposed to view. The parts will remain in this position until the rod I' is slid to the left again and its notch brought beneath the plate F', whereupon the spring $H^4$ will throw the lower end of the lever forward to normal position again, the lower edge of the plate F' traveling in the notch in the rod and holding the latter from return movement to the right under the stress of its spring J' as before explained. The means for sliding the rod I' to the right to thus release the lever E' and drop the screen plate to hide the indicators consists of a rearward extension L' of the arm Q, Figs. 4, 6 and 8, fast upon and depending from the rod as heretofore described. When this rod is slid to the left by pushing the rod S the extension L' of the arm Q will engage the collar of the rod I' and carry the latter to the left also, with the result above stated.

The framework of the machine rests upon the usual base M' provided with a drawer-compartment containing the money-drawer N'. This drawer when closed is locked by a vertically sliding bolt O' mounted in a suitable guideway in the lower cross piece of the framework and pressed downward by a flat spring P', Fig. 4. A lever Q' pivoted upon a vertical pivot has a beveled end engaging a notch in the side of the bolt O', Fig. 5. When the right hand end of this lever is moved rearward and its left end forward the bolt O' will be lifted and the drawer released, whereupon the drawer will be thrown open by a suitable spring R' placed behind it. The right hand end of the lever Q' stands in the path of the rear end of the rod H', Fig. 7, so that when the latter is slid rearward to its limit of movement the lever will be rocked and the drawer released. The alarm gong S' of the machine is in this instance secured upon a separate plate T' fastened upon the right hand side frame of the machine and sounded by a striker U' pivoted upon said plate and pulled toward the gong by a coiled spring V'.

The lower end of the striker arm has pivoted to it a trip W', Fig. 9, which depends into the path of a block or collar X' fast upon the rod H'. Whenever the rod is pushed rearward the block X' engages the trip W' and rocks the striker upon its pivot, and when the block clears the trip the spring V' throws the striker against the gong. In the return forward movement of the rod the block flips the trip up and passes freely by it.

A spring Y' coiled around the rod H' between its rear guideway and the block X' yieldingly holds the rod in and returns it to its normal position.

The rod H' is provided upon its under side near its forward end with a rack Z', Fig. 7, which meshes with a pinion $A^2$ fast upon a rock-shaft $B^2$, Fig. 5, journaled at its opposite ends in the side-frames of the machine. Also fast upon said shaft, one near each of its ends, Fig. 2, are two other pinions $C^2$ which mesh with racks $D^2$ secured upon the side plates or supporting arms $E^2$ of the pressure bar A' by which said bar is secured to the front ends of the arms Y Y heretofore described. The side arms $E^2$ are slotted and embrace the shaft $B^2$. When the bar A' is depressed to its limit of movement the racks $D^2$ turn the shaft $B^2$ rearward, which causes the pinion $A^2$ to carry the rod H' rearward and lift the screen plate, release the drawer and sound the alarm in the manner heretofore explained. When pressure on the bar is removed its upward movement under the influence of the springs $X^6$ and $X^7$, aided by the spring Y' around the rod H', will return the latter to its normal forward position.

In the machines manufactured under the patents before mentioned the rod H' projects through the front of the casing and is provided with a push button by which it may be pushed rearward to release the drawer, lift the screen and sound the alarm, no other means for actuating it to accomplish these results being provided.

The improvement covered by the Brooke application before referred to consisted in providing a special pressure bar extending across the machine immediately in front of the bar A' and gearing such special bar to the rod H' by means of racks $D^2$ upon its supporting side arms, pinions $C^2$, shaft $B^2$, pinion $A^2$ and rack Z'. The sole duty of the bar A', under that improvement, was to depress the locking bar W, as in the old machine. The operator depressed it at the end of the downward stroke of each lever, for that purpose, but did not touch or depress the special pressure bar until he had given the last lever the necessary movement to indicate and register the desired amount. The provision of the special pressure bar was necessitated by reason of the fact that the upper ends of the rods X were pivoted directly to the side arms of the locking bar W, as they were in the old machine upon which the Brooke improvement was made, and consequently when the pressure bar A' was depressed until the bar W was engaged with the pinions E it was positively arrested by such engagement. By providing the yielding connection between the bars A' and W, which permits additional movement of the bar A' after the bar W has engaged the pinions E, I am enabled to dispense with the special bar of the Brooke improvement and cause the bar A' to perform its duties.

As compared with the old machines, therefore, this feature of my invention consists in the new combination and arrangement of parts by which the pressure bar A' is caused to perform not only its old duty of actuating the locking bar W, but also the additional duties of releasing the drawer, sounding the alarm and lifting the screen plate, or any one or more of such additional duties; while as compared with the Brooke improvement it consists in dispensing with the special pressure bar and causing the old pressure bar to perform its duties. It will be understood that this feature of my invention is not restricted to the particular means shown for connecting the bar A' with the rod H', since such means may be widely varied, just as may be the similar means employed in the Brooke improvement for connecting the special pressure bar to such rod. So too, a different form of yielding connection between the bar A' and the locking bar W may be substituted for that which I have shown and described.

The second feature of my invention relates to the registering mechanism, and more particularly to the means for effecting the transfers from the wheels of lower to the wheels of higher denominations, and may be now described.

The gear wheels E, which are loosely mounted upon the shaft F and mesh with the segments on the operating levers A, have fast upon their right sides circular disks $H^2$, each of which carries a pawl $I^2$ spring-pressed into engagement with a ratchet $J^2$ loose upon the shaft F beside the disk, Figs. 3 and 6. These ratchets have fast upon their sides gears $K^2$, which mesh with gears $L^2$ fast upon the right hand ends of sleeves $M^2$ loose upon a second shaft $N^2$ in front of and parallel with the shaft F. The sleeves $M^2$ have fast upon their left hand ends the registering wheels $O^2$, each provided upon its periphery with two series of numbers representing the nine digits and a naught. It will be seen from this construction that when any one of the operating levers A is pulled downward the registering wheel in gear with it will be turned forward, and when the lever is returned to its upper normal position the pawl $I^2$ will slip idly backward over the ratchet $J^2$ and permit the registering wheel to remain in the position to which it has been moved. The adjustment of the parts is such that at each stroke of an operating lever its connected registering wheel will be turned forward one tenth of a half revolution for each ninth of a stroke of the lever.

Fast upon the left hand end of the hub of each registering wheel is a cam disk $P^2$, Fig. 6, provided with two diametrically opposite cam projections $Q^2$ adapted to co-operate with a lug $R^2$ upon the side of a vertical pawl-carrying plate $S^2$. The upper ends of these plates are provided with wide slots or recesses embracing the shaft $N^2$ and permitting both vertical movement of the plates and backward and forward movement of their upper ends. The upper ends of the plates are confined between the disk $P^2$ upon the right of each plate and the gear $L^2$ on the sleeve $M^2$ of the next higher registering wheel on the left, and each plate has pivoted to it a pawl $T^2$, Fig. 5, spring-pressed against a stop $U^2$ and adapted to engage the adjacent gear $L^2$ when the plate is thrown rearward and to then turn said gear and its registering wheel when the plate is moved downward.

At the completion of a half revolution of any one of the registering wheels the naught in one of its series of numbers will be brought to the reading point, and one of its cams $Q^2$ will engage the lug $R^2$ upon the adjacent pawl-carrying plate $S^2$ and throw the upper end of the plate rearward and engage its pawl $T^2$ with the gear $L^2$ of the next higher registering wheel, as in Fig. 5, and thus "set" the pawl for the transfer to such higher wheel of the amount registered by the half revolution of the lower wheel. The front edges of the upper ends of the plates $S^2$ fit in vertical slots in housings $V^2$ secured upon the rear side of the front cross bar $W^2$ of the framework. Confined in horizontal bores in these housings are spring-plungers $X^2$, Figs. $6^a$ and $6^b$ whose outer ends bear against the sides of the plates $S^2$ when the latter rest in the slots and which are adapted to spring outward in front of the plates as soon as they are thrown rearward in the manner above described, and to hold the plates in such rearward position until after they have been depressed to effect the transfers in the manner hereinafter explained.

The front edges of the plates $S^2$, a short distance above the plungers $X^2$, are cut away or provided with recesses and the shoulders $Y^2$ formed at the lower ends of such cut-away spaces are beveled off upon their sides adjacent the ends of the plungers, Fig. 6. Coiled springs $Z^2$ connected at their upper ends to the cross bar $W^2$ of the framework and at their lower ends to the plates $S^2$ tend to pull the latter upward and their upper ends forward, and yieldingly hold them in normal position. When the upper end of a plate $S^2$ has been thrown rearward by the cam $Q^2$ upon the adjacent registering wheel, in the manner before described, and the plate is then moved downward, its spring $Z^2$, as soon as the shoulder $Y^2$ of the plate clears the plunger $X^2$ which has held the plate in rearward position, Fig. 5, will at once pull the upper end of the plate forward, disengaging its pawl $T^2$ from the gear $L^2$ with which it was engaged and carrying the beveled shoulder $Y^2$ of the plate beneath the end of the plunger. As soon as the plate is released by the means which has moved it downward the spring $Z^2$ will pull it upward to normal position, the shoulder $Y^2$ forcing the plunger back into its housing as it rises by it.

The lower ends of the pawl-carrying plates $S^2$ are provided with slots $A^3$ through which passes a rod $B^3$ secured at its opposite ends in supporting plates $C^3$ depending from the side-arms Y Y of the pressure-bar $A'$, heretofore described. Whenever said bar is depressed to its limit of movement the rod $B^3$ will draw down the plates $S^2$ and cause the pawls of any of them which have been set for transfer to turn the next higher registering wheels each one number. The slots $A^3$ are of such gradually increasing length from the right hand plate to the left hand one, or arranged in such relative positions in the plates $S^2$, that when the rod $B^3$ is depressed it will first draw down the right hand plate to effect the transfer from the first to the second registering wheel in event such a transfer is to be made; then the second plate, to effect the transfer between the second and third wheels, and so on through the series; and in this manner the complete and proper transfers are insured no matter what the amount registered at the operation of the machine may be, or the position in which the several wheels may stand at the beginning of the operation.

In Figs. 11 and 12 I have shown a modified arrangement of parts for effecting the transfers by the operation of the pressure bar $A'$. Under this construction the transfer pawl $D^3$ is carried by a curved arm $E^3$ hung at its rear end upon the shaft F and extending forward beside the gear $L^2$. In a housing $F^3$ upon the front end of this arm is confined a spring-plunger $G^3$ whose projecting front end co-operates with two notches $H^3$ $I^3$ in the rear side of a vertical plate $J^3$ secured to the cross bar $W^2$ of the framework, Fig. 11, to yieldingly hold the front end of the arm in either upper or lower position.

The arm has upon its right side in rear of the shaft $N^2$ a lug $K^3$, Fig. 12, corresponding to the lugs $R^2$ upon the plates $S^2$, which lug co-operates with the cams $Q^2$ upon the adjacent registering wheel. When the latter completes a half revolution one of the cams $Q^2$ will ride under the lug $K^3$ and lift the front end of the pawl-carrying arm $E^3$, causing its pawl $D^3$ to slip upward over one tooth of the gear $L^2$. The engagement of the spring-plunger $G^3$ with the notch $H^3$ will yieldingly hold the arm in this upper position until it is pulled downward, to effect the transfer, by the hooked or notched upper end of a plate $L^3$, similar to the plates $S^2$, which co-operates with a stud $M^3$ projecting laterally from the housing $F^3$ on the arm $E^3$.

The plates $L^3$ for the several pawl-carriers are connected at their lower ends to the rod $B^3$ of the pressure-bar frame in the same manner as the plates $S^2$, and springs $N^3$, similar to the springs $Z^2$, yieldingly hold them in and return them to their normal upper positions.

It will be seen that the modes of operation under both of the constructions above described are substantially the same, the pawl-carriers in each case being automatically set by the cams or projections upon the registering wheels, and then actuated by the pressure bar to effect the transfers. Other modifications in the construction and arrangement of the parts may be made without departing from this general mode of operation or the scope of my invention.

In the machines manufactured and sold under the patents hereinbefore mentioned the transfers between the registering wheels are effected automatically by spring actuated pawl-carriers in such manner that if a registering wheel is being turned by its operating lever at the time a transfer to it from a lower wheel is to be effected such transfer will be lost and the wheel be turned only by its operating lever, and to prevent such miscarriage of the transfers the machines are provided with means which prevents the operation of more than one lever at the same time.

Under my improvement as many levers as desired may be pulled down simultaneously, and the transfers will be afterward automatically made by the operation of releasing the drawer, sounding the alarm, &c., the operation of the machine being thereby simplified and made more expeditious.

In the old machine the front end of the rod S, Fig. 6, heretofore described, projects through the front of the casing and has on it a push button by which the rod is pushed rearward to release the operating levers and screen plates. I have geared this rod to a sliding bar $O^3$ in a similar manner to the gearing of the rod $H'$ to the pressure bar $A'$, Fig. 10, by means of a rack $O^5$ on said bar meshing with a pinion $O^6$ loose on the shaft $B^2$ and having fast upon its side a gear $O^7$ and meshing with a rack upon the under side of the rod S. The bar $O^3$ has upon its upper end a finger-piece $P^3$ flush with the left hand end of the bar $A'$, by depressing which the rod S can be slid rearward to perform its several duties. The removal of the projecting front end of the rod S and its push button and the substitution of the finger-piece $P^3$ at the end of the bar $A'$ improves the appearance of the machine and at the same time affords a more convenient means for operating the rod, S.

Having thus fully described my invention, I claim—

1. In a cash register and indicator, the combination, with the operating levers, each provided with the series of numbers and finger pieces, and the register and indicator geared thereto, of the pressure bar extending across the front of the levers, the locking bar co-operating with the wheels of the gearing, and a yielding connection between the pressure bar and the locking bar to permit additional movement of the former after it has moved the latter into locking position, substantially as described.

2. In a cash register and indicator having a money-drawer and locking mechanism therefor, the combination of the operating levers each provided with the series of numbers and finger-pieces, the indicator and register geared thereto, the pressure bar extending across the front of the levers, the locking bar operating to arrest the indicators and register when thrown into locking position, connections between the pressure bar and the locking mechanism of the money-drawer, for releasing the latter by means of the pressure bar, and a yielding connection between such bar and the locking bar, to cause the pressure bar to first throw the locking bar into locking position and then release the money-drawer, substantially as described.

3. In a cash register and indicator having an alarm-gong and a striker therefor, the combination of the operating levers each provided with the series of numbers and finger-pieces, the indicator and register geared thereto, the pressure-bar extending across the front of the same, the locking bar, connections between the pressure bar and the gong-striker for actuating the latter, and a yielding connection between said bar and the locking bar, substantially as and for the purpose described.

4. In a cash register and indicator, the combination of the operating levers each provided with the series of numbers and finger-pieces, the indicators and registers geared thereto, the screen-plate for the indicators, the locking bar, the pressure bar extending across the front of the levers, connections between said bar and the screen plate for actuating the latter, and a yielding connection between said bar and the locking bar, substantially as and for the purpose described.

5. In a cash register and indicator, the combination of the operating levers each provided with the series of numbers and finger-pieces, the indicators and register geared thereto, the screen-plate, the money-drawer and its lock and the gong and its striker, the locking bar, the pressure bar extending across the front of the operating levers, connections between said bar and the drawer-lock, gong-striker and screen-plate for actuating them, and a yielding connection between the pressure bar and the locking bar to permit the former to perform its additional duties after throwing the locking bar into locking position, substantially as described.

6. In a cash register and indicator, the combination of the operating levers each provided with the series of numbers and finger-pieces, the indicators and register geared thereto, the oscillating locking bar co-operating with toothed wheels of the gearing, the spring for holding the same in normal position, the pressure-bar frame, the arms connected thereto and extending through holes in the locking bar or its supporting arms, and the springs confined upon said rods and bearing against the locking bar, substantially as and for the purpose described.

7. In a cash register and indicator, the combination of a series of operating levers, a register and indicators actuated thereby, a screen-plate for the indicators, a locking bar, a pressure bar extending across the front of the levers, and connections between said pressure bar and the screen-plate and locking bar, for actuating them.

8. In a cash register and indicator, the combination of a series of operating levers, a register and indicator actuated thereby, a screen-plate for the indicators, a money-drawer and lock for holding it closed, an alarm-gong and a striker for sounding it, a locking bar for arresting the indicators or register, a pressure bar extending across the front of the levers, and connections between said pressure bar and the screen-plate, drawer lock, gong-striker and locking bar, for actuating them.

9. In a cash register such as described, the combination of the operating levers each provided with the series of numbers and finger-pieces, the registering wheels actuated thereby, transfer devices between the several wheels, the pressure bar extending across the front of the levers in position to be struck and depressed by the hand of the operator by the same stroke which moves the operating lever, and connections between said bar and the transfer devices for actuating the latter by the operation of the bar whereby the transfers are effected by a continuation of the same movement which operates the registering mechanism.

10. In a cash register, the combination of the operating levers each provided with the series of numbers and finger-pieces, the registering wheels actuated thereby, the transfer pawls, means for automatically setting them for transfer by the movement of the wheels, the pressure bar extending across the front of the levers in position to be struck and depressed by the hand of the operator by the same stroke which moves the operating lever, and connections between said bar and the transfer pawls for actuating the latter in succession from the lower to the higher denominations to effect the transfers, substantially as described.

11. In a cash register, the combination of the series of operating levers each provided with the series of numbers and finger-pieces, the registering wheels actuated thereby and each provided with one or more projections or cams, transfer-pawls positively moved to transfer position by said cams, the pressure bar extending across the front of the levers in position to be struck and depressed by the hand of the operator by the same stroke which moves the operating lever, and connections between said bar and the transfer pawls for actuating the latter in succession from the lower to the higher denominations to effect the transfers, substantially as described.

12. In a cash register, the combination of the series of operating levers each provided with the series of numbers and finger-pieces, the registering wheels actuated thereby, the pawl-carriers carrying the transfer pawls, the cam projections upon the wheels co-operating with the pawl-carriers to positively move them into position for the pawls to effect the transfers means for positively holding them in such position, the pressure bar extending across the front of the operating levers in position to be struck and depressed by the hand of the operator by the same stroke which moves the operating lever, and connections between said bar and the pawl-carriers for actuating the latter in succession from the lower toward the higher denominations, substantially as described.

13. In a cash register, the combination of the series of operating levers each provided with the series of numbers and finger pieces, the registering wheels actuated thereby, the vertical pawl-carrying plates capable of vibrating backward and forward at their upper ends and movable vertically, the transfer pawls carried thereby, the cam projections upon the wheels, for moving the upper ends of said plates into position for their pawls to effect the transfers, the vibrating presser-bar frame, and the cross-rod carried thereby and engaging the lower ends of the pawl carrying plates, substantially as described.

14. In a cash register, the combination of the series of operating levers each provided with the series of numbers and finger-pieces, the registering wheels actuated thereby, the vertical pawl-carrying plates capable of vibrating backward and forward at their upper ends and moving vertically, the transfer pawls carried thereby, the springs for holding said plates in normal position, the cam projections upon the wheels for moving them into position for their pawls to effect the transfers, means for holding them in such moved position against the stress of their springs, and the vibrating presser-bar frame having the cross rod passing through the lower ends of said plates, substantially as described.

15. In a cash register, the combination of the series of operating levers, each provided with the series of numbers and finger-pieces, the series of sleeves loose upon the horizontal shaft, the registering wheels fast upon the sleeves at one end and the gears fast upon them at the other, said gears being actuated by the operating levers, the vertically movable pawl-carrying plates slotted at their upper ends and loosely embracing the horizontal shaft, one between each registering wheel and the adjacent gear upon the sleeve of the next higher wheel, the transfer pawls carried by said plates and adapted to engage the gears, the springs for holding the plates in normal position, the cam projections upon the wheels co-operating with lugs upon the plates to move the latter into position for their pawls to engage the gears, means for holding the plates in such position against the stress of their springs, and the vibrating pressure bar frame having the cross rod passing through slots in the lower ends of the plates and adapted to successively depress the latter when the pressure bar is operated, substantially as described.

16. In a cash register such as described, the combination of the operating levers each provided with the series of numbers and finger-pieces, the registering wheels actuated thereby, transfer devices between the several wheels, the money-drawer and its lock, the pressure bar extending across the front of the levers in position to be struck and depressed by the hand of the operator at the same stroke which moves an operating lever, and connections between said bar and the transfer devices and drawer-lock for effecting the transfers and releasing the drawer by a continuation of the same movement which operates the registering mechanism.

17. In a cash register such as described, the combination of the operating levers each provided with the series of numbers and finger-pieces, the registering wheels actuated thereby, transfer devices between the several wheels, the alarm-gong and its striker, the pressure-bar extending across the front of the levers in position to be struck and depressed by the hand of the operator at the same stroke which moves an operating lever, and connections between said bar and the gong-striker and transfer devices for sounding the gong and effecting the transfers by a continuation of the same movement which actuates the registering mechanism.

18. In a cash register such as described, the combination of the operating levers each provided with the series of numbers and finger-pieces, the registering wheels actuated thereby, transfer devices between the several wheels, the money-drawer and its lock, the alarm-gong and its striker, the pressure-bar extending across the front of the levers in position to be struck and depressed by the hand of the operator at the same stroke which moves the operating lever, and connections between said bar and the drawer-lock, gong-striker and transfer devices, for releasing the drawer, sounding the alarm and effecting the transfers by a continuation of the same movement which actuates the registering mechanism.

19. In a cash register and indicator such as described, the combination of the operating levers each provided with a series of numbers and finger-pieces, the registering wheels and indicators actuated thereby, the movable screen-plate for alternately hiding and exposing the indicators, transfer devices between the several registering wheels, the pressure-bar extending across the front of the operating levers in position to be struck and depressed by the hand of the operator at the same stroke which moves one of said levers, and connections between said bar and the screen-plate and transfer devices for exposing the indicators and effecting the transfers by a continuation of the same movement which sets the indicators and actuates the registering mechanism.

20. In a cash register, the combination of a series of operating levers, a register actuated thereby, transfer devices between the wheels of the register, a money-drawer, a lock for holding it closed, a pressure bar extending across the front of the levers, and connections between said bar and the drawer-lock and transfer devices for releasing the drawer and effecting the transfers.

21. In a cash register, the combination of a series of operating levers, a register actuated thereby, transfer devices between the several wheels of the register, an alarm-gong, a striker therefor, a pressure bar extending across the front of the levers, and connections between said bar and the gong-striker and transfer devices, for sounding the gong and effecting the transfers.

22. In a cash register, the combination of a series of operating levers, a register actuated thereby, transfer devices between the several wheels of the register, a money-drawer, a lock for holding it closed, an alarm-gong, a striker therefor, a pressure bar extending across the front of the operating levers, and connections between said bar and the drawer-lock, gong-striker and transfer devices, for releasing the drawer, sounding the gong and effecting the transfers by the operation of said bar.

23. In a cash register and indicator, the combination of a series of operating levers, a register and indicators actuated thereby, a movable screen-plate for alternately hiding and exposing the indicators, transfer devices between the several wheels of the register, a pressure bar extending across the front of the levers, and connections between said bar and the screen-plate and transfer devices, for exposing the indicators and effecting the transfers.

24. In a cash register and indicator, the combination of a series of operating levers, a register and indicators actuated thereby, a movable screen for alternately hiding and exposing the indicators, transfer devices between the several wheels of the register, a money-drawer, a lock for holding the same closed, an alarm-gong, a striker therefor, a pressure bar extending across the front of the operating levers, and connections between said bar and the screen-plate, drawer-lock, gong-striker and transfer devices, for exposing the indicators, releasing the drawer, sounding the alarm and effecting the transfers by the operation of said bar.

25. The combination of a primary and a secondary registering wheel, a reciprocating pawl-carrying plate also movable transversely to its line of reciprocation and carrying a pawl adapted to engage the secondary wheel, a cam turning with the primary wheel and adapted to co-operate with the pawl-carrying plate to move the latter transversely to its line of reciprocation to position for its pawl to engage the secondary wheel, a spring-plunger engaging the plate to hold it in the position to which it is moved by the cam, means for reciprocating the plate, and a shoulder on the plate co-operating with the plunger when the plate is re-set to normal position, substantially as described.

26. The combination of a primary and a secondary registering wheel, a reciprocating pawl-carrying plate carrying a pawl adapted to engage the secondary wheel, a cam turning with the primary wheel and adapted to co-operate with the pawl-carrying plate to move the latter to position for its pawl to engage the secondary wheel, a spring for yieldingly holding the plate in and returning it to normal position, a spring plunger for holding it in the position to which it is moved by the cam of the primary wheel, means for moving the plate after it has been set by said cam, to cause its pawl to turn the secondary wheel, and a shoulder upon the plate co-operating with the spring-plunger when the plate is re-set to normal position, substantially as described.

27. The combination of a primary and a secondary registering wheel mounted upon a horizontal shaft, a reciprocating pawl-carrying plate provided at one end with a slot or recess loosely embracing the shaft and confined at one edge in a slot in a fixed part of the framework, a pawl carried by the plate and adapted to co-operate with the wheel, a cam upon the primary wheel adapted to engage the plate and move it to position for its pawl to engage the secondary wheel, a spring-plunger confined in a housing and adapted to project into the slot in which the edge of the plate fits when the latter is moved by the cam, a spring for yieldingly holding the plate in and returning it to normal position, and a beveled shoulder upon the plate adapted to move through the slot as the plate is re-set to normal position and force the plunger into its housing, substantially as described.

JOSEPH P. CLEAL.

Witnesses:
JOHN M. BUCKLES,
PEARL N. SIGLER.